US011772033B2

(12) United States Patent
Brito

(10) Patent No.: US 11,772,033 B2
(45) Date of Patent: Oct. 3, 2023

(54) APPARATUS AND METHOD FOR REDUCING POLLUTION EMITTED BY AN INDUSTRIAL EXHAUST SOURCE

(71) Applicant: Alejandro Fidel Brito, Kissimmee, FL (US)

(72) Inventor: Alejandro Fidel Brito, Kissimmee, FL (US)

( * ) Notice: Subject to any disclaimer, the term of this patent is extended or adjusted under 35 U.S.C. 154(b) by 785 days.

(21) Appl. No.: 15/695,000

(22) Filed: Sep. 4, 2017

(65) Prior Publication Data

US 2018/0169560 A1 Jun. 21, 2018

Related U.S. Application Data

(60) Provisional application No. 62/434,637, filed on Dec. 15, 2016.

(51) Int. Cl.
*B01D 47/06* (2006.01)

(52) U.S. Cl.
CPC .................................... *B01D 47/06* (2013.01)

(58) Field of Classification Search
None
See application file for complete search history.

(56) References Cited

U.S. PATENT DOCUMENTS 2,387,345 A * 10/1945 Pearl ......................... F27B 1/18 261/126
2,589,956 A 3/1952 Panteleieff
3,460,819 A * 8/1969 Pike .......................... F27B 1/18 266/147
3,895,926 A * 7/1975 Lerner .................. B01D 47/06 95/219
3,953,181 A * 4/1976 Chung .................. B01D 47/00 96/240
4,372,761 A * 2/1983 Lindroos ............... B01D 47/06 422/176

(Continued)

FOREIGN PATENT DOCUMENTS

CN 101417196 A 4/2009
DE 3317030 A1 11/1984

(Continued)

*Primary Examiner* — Christopher P Jones
*Assistant Examiner* — Phillip Y Shao
(74) *Attorney, Agent, or Firm* — The Patent Professor, P.A.; John Rizvi

(57) ABSTRACT

An apparatus for reducing pollution emitted by an industrial exhaust source comprises a sleeve having an interior cavity, and at least one sidewall. A sprinkler or water injection system supplies water to the interior cavity of the sleeve, and comprises an incoming water tubing assembly for water flow. At least one secondary tube connects the incoming water tubing assembly to a corresponding number of nozzles within the interior cavity, each injecting a plurality of streams or jets of water therein to cleanse out the mix of pollutants. A hole at a base of the sleeve leads to a pipe, draining the water and the mix of pollutants carried by the water. The base is circumferentially-arranged and slopes down towards the pipe. The pipe is also sloped downward, both allowing for easier flow of the water and the mix of pollutants, preventing collection of these within the base.

18 Claims, 7 Drawing Sheets

100
118
110
150
140
120
164
166
138
140
160
166
132
172
134
136
166

(56) References Cited

U.S. PATENT DOCUMENTS

| | | | | |
|---|---|---|---|---|
| 4,375,976 | A * | 3/1983 | Potter | B01D 50/008 159/4.02 |
| 5,201,919 | A * | 4/1993 | Jahn | B01D 47/06 96/262 |
| 5,862,819 | A * | 1/1999 | Cradeur | B01D 53/1487 134/102.1 |
| 2008/0282655 | A1* | 11/2008 | Hecker | B01D 47/06 55/466 |
| 2015/0174527 | A1* | 6/2015 | Takahashi | F01N 3/04 422/168 |

FOREIGN PATENT DOCUMENTS

| | | |
|---|---|---|
| GB | 19762 | 9/1913 |
| GB | 469462 A | 7/1937 |

* cited by examiner

APPARATUS AND METHOD FOR REDUCING POLLUTION EMITTED BY AN INDUSTRIAL EXHAUST SOURCE

CROSS-REFERENCE TO RELATED APPLICATIONS

This application claims the benefit of U.S. Provisional Patent Application Ser. No. 62/434,637, filed on Dec. 15, 2016, which is incorporated herein in its entirety.

FIELD OF THE INVENTION

The present invention relates generally to an apparatus and a method for reducing pollution emitted into air by an industrial exhaust source, and more specifically to an apparatus and method in which water is sprinkled or injected onto exhaust air, and pollutants carried by sprinkled water are drained separately to the exhaust air, thereby reducing emissions of pollutants into the atmosphere.

BACKGROUND OF THE INVENTION

Pollution from an industrial exhaust source, such as a chimney, is emitted into the air, contributing to the problem of climate change. This in turn has significant global impact, such as rising temperature of the earth's surface and destruction of the ozone layer in the atmosphere, thus endangering the future sustainability of life on earth. Additionally, such pollution, when inhaled, presents health problems for people, including respiratory trouble and, potentially, lung cancer.

Currently, there are apparatuses and methods for reducing pollution emitted into the air, but many of these involve complex systems, such as thermal, electrical or magnetic means of quarantining pollution. They also often involve water streams for trapping the pollution and a drainage system for collection thereof, which in and of themselves are simple features, but again, these are often in conjunction with any of the aforementioned complex systems. Thus, there is a need for a much simpler apparatus and method that will allow for efficient reduction of pollution from an industrial exhaust source.

SUMMARY OF THE INVENTION

An apparatus for reducing pollution emitted into air by an industrial exhaust source comprises a sleeve having an interior cavity and at least one sidewall. A sprinkler system supplies water to a set of nozzles within the interior cavity of the sleeve. Each nozzle injects a plurality of streams of water therein to cleanse out the mix of pollutants. A hole at a base of the sleeve leads to a pipe for draining the plurality of streams of water and the mix of pollutants. The base can be circumferentially-shaped with a downward slope. The pipe can be sloped downward, both allowing for easier flow of the plurality of streams of water and the mix of pollutants, thus preventing collection and stagnation of these within the base.

In a first implementation of the invention, an apparatus, for reducing pollution emitted into air by an industrial exhaust source expelling exhaust air carrying at least one pollutant, comprises a sleeve configured to extend from a top end of an industrial exhaust source. The sleeve has an interior cavity for the traveling therethrough of exhaust air from the industrial exhaust source, at least one sidewall delimiting the interior cavity, and an open top end. The apparatus further includes a sprinkler system for supplying water to the interior cavity of the sleeve. The sprinkler system comprises at least one nozzle arranged within the interior cavity. The one or more nozzles are configured to inject water towards the at least one sidewall of the sleeve and through exhaust air traveling through the interior cavity and carrying at least one pollutant. The apparatus further includes one or more drainage pipes open to the interior cavity of the sleeve for draining water and at least one pollutant carried by the water from the interior cavity.

In a second aspect, a base of the sleeve can include a channel configured to collect water and at least one pollutant falling along the at least one sidewall and to carry the water and at least one pollutant towards the one or more drainage pipes.

In another aspect, the base can include an inwardly-directed bottom section and an upwardly-directed neck extending from the inwardly-directed bottom section in a spaced-apart relationship with the at least one sidewall of the sleeve. The channel can be delimited by the at least one sidewall, the inwardly-directed bottom section and the upwardly-directed neck.

In another aspect, the channel can be sloped downward towards the one or more drainage pipes.

In another aspect, the one or more drainage pipes can consist of a single drainage pipe, and the channel can be circumferentially-shaped and sloped downward towards the drainage pipe.

In another aspect, the apparatus can further include a structure supporting the apparatus to extend from the top end of the industrial exhaust source.

In another aspect, the structure can include at least one ring encircling the sleeve and a plurality of supporting beams resting against and extending from the at least one ring.

In another aspect, the sprinkler system can further include an incoming water tubing assembly configured to receive water from a water supply source external to the sleeve. The incoming water tubing assembly can be in fluid communication with the at least one nozzle to feed water to the at least one nozzle.

In another aspect, the apparatus can further include at least one secondary tube extending from the incoming water tubing assembly, through the sleeve and into the interior cavity. Each secondary tube of the at least one secondary tube carries, and is configured to feed water to, one or more nozzles.

In another aspect, each secondary tube can carry a single nozzle.

In another aspect, the sleeve can be cylindrical.

In another aspect, the nozzle or nozzles can be configured to inject water horizontally towards the at least one sidewall of the sleeve.

In another aspect, the nozzle or nozzles can be arranged at a central longitudinal axis of the sleeve.

In another aspect, the at least one nozzle can be configured to inject a plurality of water jets radially outward thereof.

In another aspect, the apparatus can include two or more nozzles arranged vertically spaced apart relative to one another.

In another aspect, the two or more nozzles can be arranged in vertical registration relative to one another.

In another aspect, the one or more drainage pipes can be sloped downward.

In another implementation of the invention, an apparatus, for reducing pollution emitted into air by an industrial exhaust source expelling exhaust air carrying at least one pollutant, comprises a sleeve configured to extend from a top end of an industrial exhaust source. The sleeve includes an interior cavity for the traveling therethrough of exhaust air from the industrial exhaust source, at least one sidewall delimiting the interior cavity, and an open top end. The apparatus further comprises a sprinkler system for supplying water to the interior cavity of the sleeve. The sprinkler system includes two or more nozzles arranged within the interior cavity in a vertically-spaced apart relationship relative to one another. The nozzle or nozzles are configured to inject water horizontally towards the at least one sidewall of the sleeve and through exhaust air traveling through the interior cavity and carrying at least one pollutant. The apparatus further includes one or more drainage pipes open to the interior cavity of the sleeve for draining water and at least one pollutant carried by the water from the interior cavity.

In yet another implementation of the invention, a method for reducing pollution emitted into air by an industrial exhaust source expelling exhaust air carrying at least one pollutant comprises a first step of providing an industrial exhaust source with an apparatus having a sleeve configured to extend from a top end of an industrial exhaust source. The sleeve comprises an interior cavity for the traveling therethrough of exhaust air from the industrial exhaust source, at least one sidewall delimiting the interior cavity, and an open top end. The apparatus further includes a sprinkler system for supplying water to the interior cavity of the sleeve. The sprinkler system comprises at least one nozzle arranged within the interior cavity. The nozzle or nozzles are configured to inject water towards the at least one sidewall of the sleeve and through exhaust air traveling through the interior cavity and carrying at least one pollutant. The apparatus further includes one or more drainage pipes open to the interior cavity of the sleeve for draining water and at least one pollutant carried by the water from the interior cavity. The method further comprises the steps of supplying water to the sprinkler system and injecting, by the at least one nozzle, the supplied water towards the at least one sidewall of the sleeve. The injected water removes one or more pollutants from exhaust air traveling through the sleeve. The at least one sidewall of the sleeve directs the water and the one or more removed pollutants to fall towards the one or more drainage pipes. The fallen water and one or more removed pollutants are then drained through the one or more drainage pipes.

These and other objects, features, and advantages of the present invention will become more readily apparent from the attached drawings and the detailed description of the preferred embodiments, which follow.

BRIEF DESCRIPTION OF THE DRAWINGS

The preferred embodiments of the invention will hereinafter be described in conjunction with the appended drawings provided to illustrate and not to limit the invention, where like designations denote like elements, and in which.

Like reference numerals refer to like parts throughout the several views of the drawings.

DETAILED DESCRIPTION

The following detailed description is merely exemplary in nature and is not intended to limit the described embodiments or the application and uses of the described embodiments. As used herein, the word “exemplary” or “illustrative” means “serving as an example, instance, or illustration.” Any implementation described herein as “exemplary” or “illustrative” is not necessarily to be construed as preferred or advantageous over other implementations. All of the implementations described below are exemplary implementations provided to enable persons skilled in the art to make or use the embodiments of the disclosure and are not intended to limit the scope of the disclosure, which is defined by the claims. For purposes of description herein, the terms “upper”, “lower”, “left”, “rear”, “right”, “front”, “vertical”, “horizontal”, and derivatives thereof shall relate to the invention as oriented in FIG. 1. Furthermore, there is no intention to be bound by any expressed or implied theory presented in the preceding technical field, background, brief summary or the following detailed description. It is also to be understood that the specific devices and processes illustrated in the attached drawings, and described in the following specification, are simply exemplary embodiments of the inventive concepts defined in the appended claims. Hence, specific dimensions and other physical characteristics relating to the embodiments disclosed herein are not to be considered as limiting, unless the claims expressly state otherwise.

Figure 1:
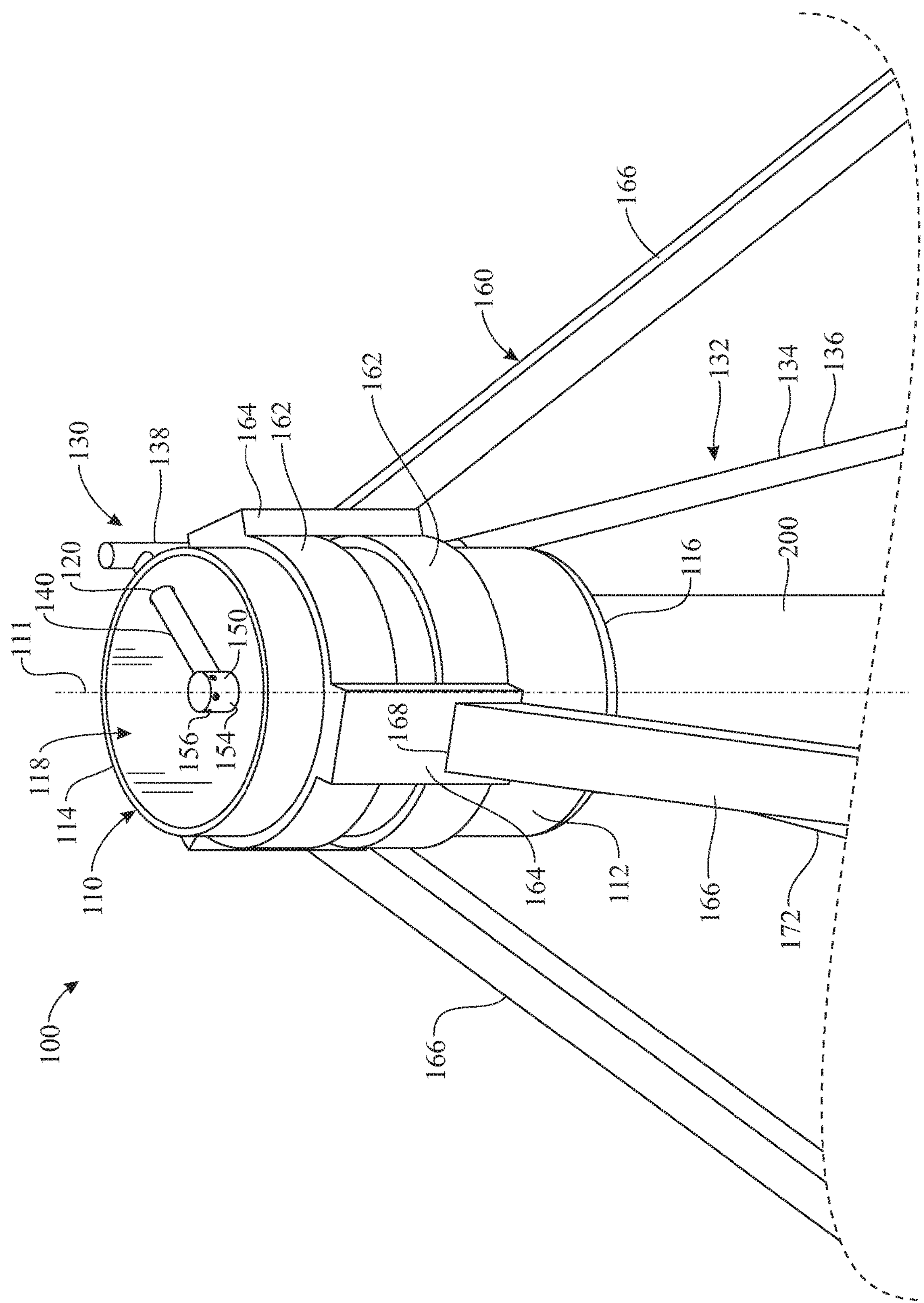
FIG. 1 presents a top perspective view showing a first illustrative embodiment of the apparatus of the present invention.
Figure 2:
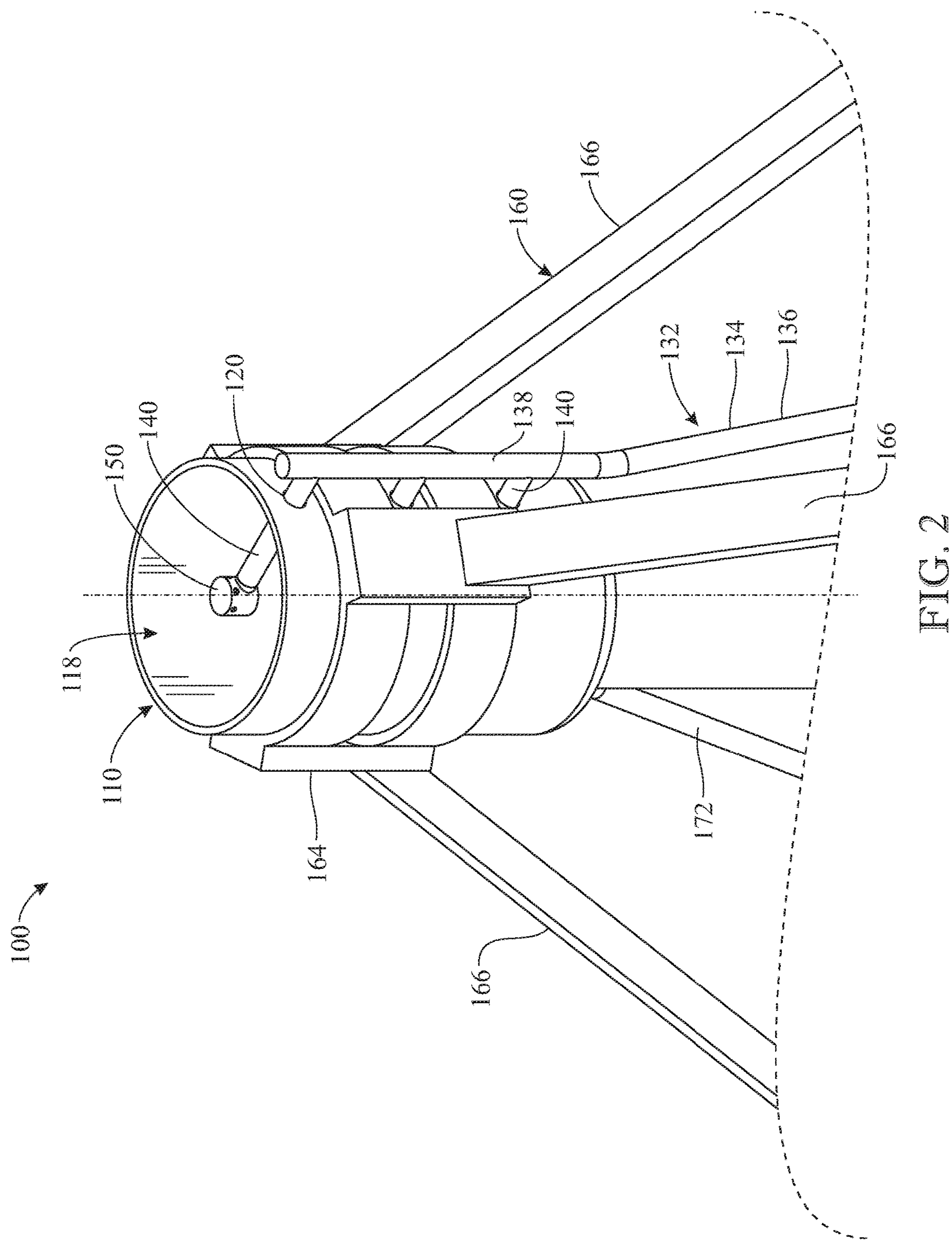
FIG. 2 presents another top perspective view of the first illustrative embodiment of the apparatus of the present invention.
Figure 3:
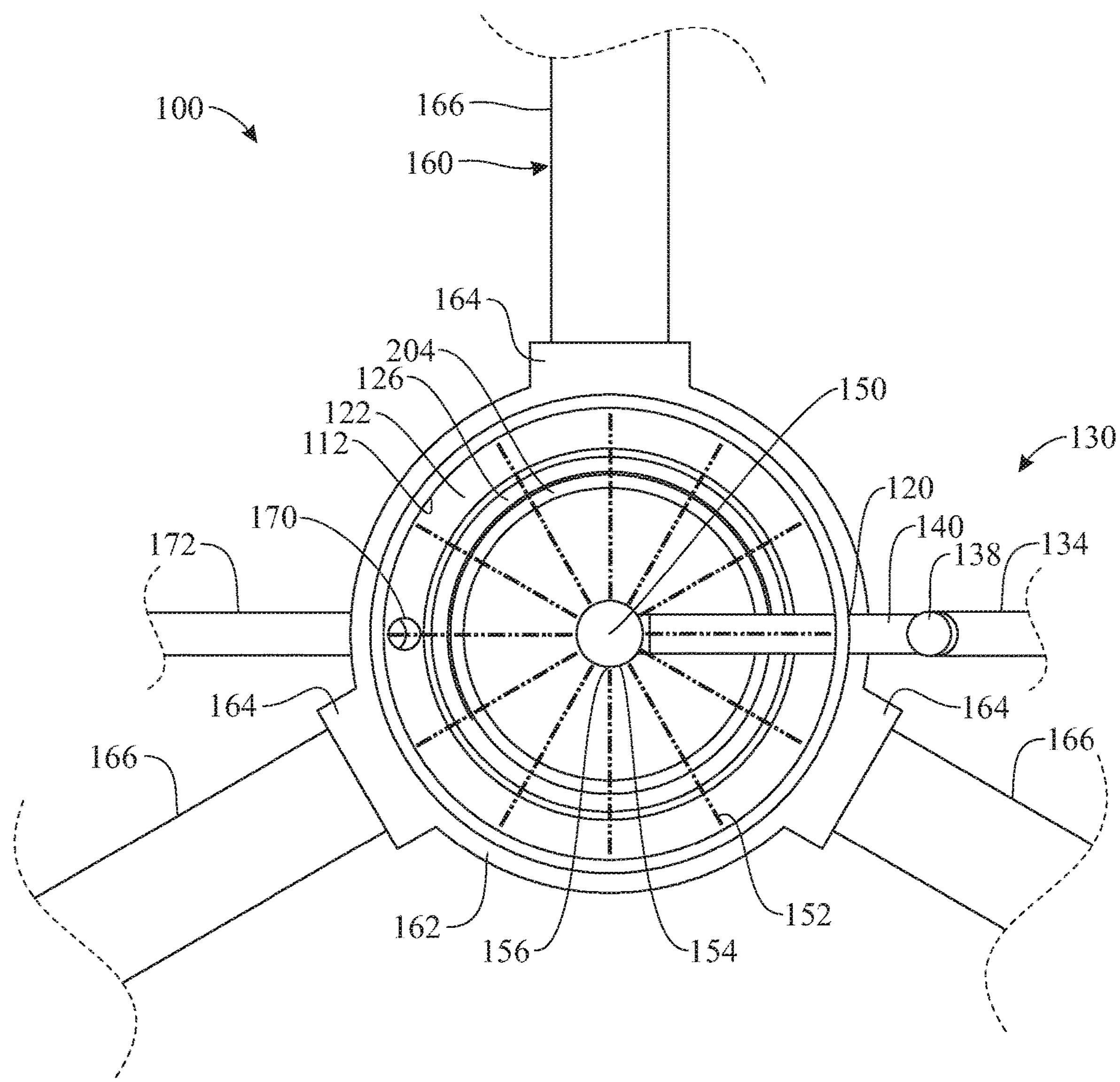
FIG. 3 presents a top plan view of the first illustrative embodiment of the apparatus of the present invention.
Figure 4:
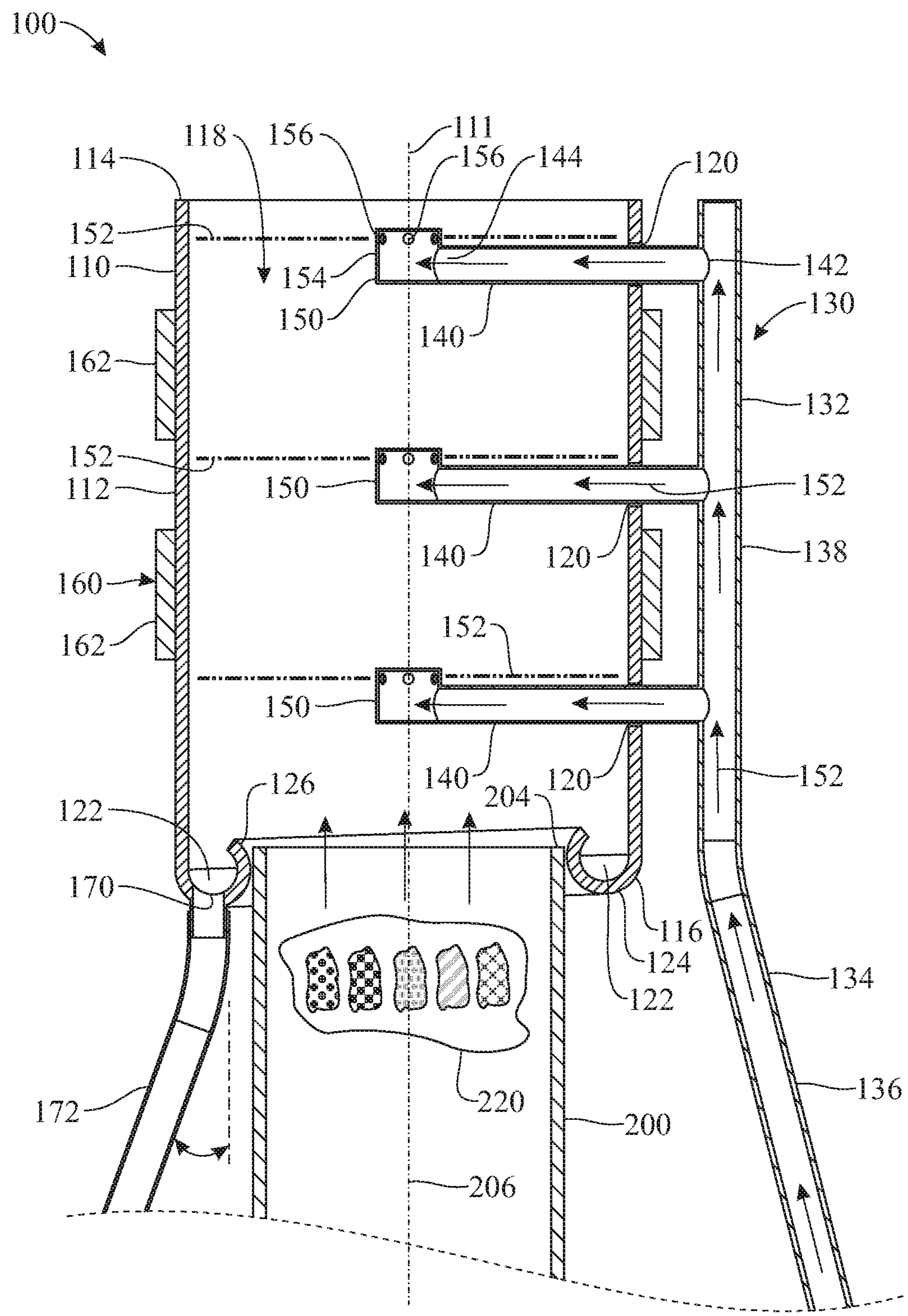
FIG. 4 presents a cross-sectional side elevation view of the first illustrative embodiment of the apparatus of the present invention, in a first stage of a method of reducing pollution in accordance with an illustrative embodiment the present invention.

An apparatus 100, generally depicted in all of FIGS. 1-7, for reducing pollution emitted into air by an industrial exhaust source 200 containing a mix of pollutants 220 from exhaust air, is disclosed herein. The apparatus 100 comprises a sleeve 110 for attaching the apparatus 100 to a top end 204 of the industrial exhaust source 200. The industrial exhaust source 200 can be, for instance, a chimney. The illustrations of FIGS. 1, 2 and 4 show that the sleeve 110 extends outside of and above the top end 204 of the industrial exhaust source 200. The sleeve 110 extends along a central longitudinal axis or axial direction 111; in some embodiments, the sleeve 110 can be cylindrical, the axial direction 111 being parallel to a central longitudinal axis of the sleeve 110. The sleeve 110 comprises at least one sidewall 112, an open top end 114, a base 116 and an interior cavity 118 delimited between the at least one sidewall 112, the top end 114 and the base 116. In some embodiments, such as the depicted embodiment, the sleeve 110 can be formed into a single-piece unit. Alternative embodiments are contemplated, however, in which the sleeve 110 may be formed of two or more parts attached to one another. A water injection system or water sprinkler system 130 (hereinafter referred to generally as sprinkler system 130) supplies water to the interior cavity 118 of the sleeve 110. A sleeve-supporting structure 160 helps the apparatus 100 stand above and in continuation of the top end 204 of the industrial exhaust source 200.

As shown in FIG. 4, the sprinkler system 130 comprises an incoming water tubing assembly 132 for carrying water into the interior cavity 118 of the sleeve 110. In the present embodiment, the incoming water tubing assembly 132 consists of a single tube 134 connected to a water source (not shown), the tube 134 having a tubular body 136 terminated in an end portion 138. The incoming water tubing assembly 132 is connected to a water supply source (not shown); for instance, the tubular body 136 of the tube 134 is connected to the water supply source for carrying water towards the sleeve 110. In turn, the end portion 138 of the incoming water tubing assembly 132 is near or is adjacent to the sleeve 110, as shown. The sprinkler system 130 further includes at least one secondary tube 140 extending from the incoming water tubing assembly 132 into the interior cavity 118 of the sleeve 110. For instance, in the present embodiment, the sprinkler system 130 specifically includes three secondary tubes 140. Each secondary tube 140 has a first end 142 and an opposite second end 144. The first end 142 of each secondary tube 140 connects to and is in fluid communication with the incoming water tubing assembly 132, for water to flow from the incoming water tubing assembly 132 into the secondary tube 140. In the present embodiment, the connection between each secondary tube 140 and the incoming water tubing assembly 132 is carried out outside the sleeve 110; i.e., the first end 142 of each secondary tube 140 is arranged outside the sleeve 110, and each secondary tube 140 extends into the sleeve 110 through a respective through opening 120 in the sidewall 112 of the sleeve 110, so that the second end 144 of each secondary tube 140 is arranged within the interior cavity 118 of the sleeve 110.

At least one nozzle 150 is carried by each secondary tube 140. For instance and without limitation, each secondary tube 140 can carry a single nozzle 150, as shown in the present embodiment. The one or more nozzles 150 can be arranged in any position along each secondary tube 140 and within the interior cavity 118 of the sleeve 110. For instance, in the depicted embodiment, each single nozzle 150 is arranged at the inner or second end 144 of a respective secondary tube 140. As mentioned heretofore, the at least one nozzle 150 of each secondary tube 140 is located within the interior cavity 118 of the sleeve 110. For example, in the present embodiment, the nozzles 150 are in vertical registration with one another and arranged at the center of the interior cavity 118, as best shown in the top plan view of FIG. 3 and the cross-sectional side elevation view of FIG. 4. As best depicted in FIGS. 3 and 4, the nozzles 150 each inject water 152 into the interior cavity 118 of the sleeve 110.

Throughout the present document, a nozzle is understood to be an opening or other water outlet for allowing water to be sprinkled or injected outwardly from the secondary tube 140. For instance, the nozzles 150 depicted herein are formed as generally cylindrical bodies having a generally cylindrical and axial (vertical) sidewall 154 with a plurality of openings 156. The openings 156 are arranged through the sidewall 154 and extending around a perimeter of the nozzle 150. The openings 156 are oriented towards the sidewall 112 of the sleeve 110, as best shown in FIGS. 1-3, so that water 152 is injected radially and circumferentially outward from the plurality of openings 156 of the nozzles 150, in the form of a plurality of streams or jets of water 152, as best shown in FIG. 3. The plurality of streams or jets of water 152 are directed towards the sidewall 112 of the sleeve 110. Furthermore, as shown in FIG. 4, the plurality of streams of water 152 can be propelled or injected horizontally across the interior cavity 118 of the sleeve 110, so that the streams of water 152 are generally perpendicular to the longitudinal axis 111 of the sleeve 110 and thus to an axial direction 206 in which exhaust air and a mix of pollutants carried thereby travel vertically upward through the sleeve 110, towards the open top end 114 of the sleeve 110, as will be described in greater detail hereinafter.

A drain or hole 170 (best shown in FIG. 3) is located at the base 116 of the sleeve 110, for the passing therethrough of water 152 and the mix of pollutants 220 collected by the base 116, as will be described in greater detail hereinafter. The hole 170 leads to and is in fluid communication with a drainage pipe 172 (best shown in FIG. 4) located outside of the sleeve 110. The pipe 172 drains the water 152 and the mix of pollutants 220 away from the sleeve 110. In some embodiments of the invention, such as the embodiment depicted herein, the pipe 172 is sloped or tilted (i.e. is neither vertical nor horizontal) for preventing clogging and bubble formation by the plurality of streams of water 152 and the mix of pollutants 220. Alternatively or additionally, the pipe 172 can be in the shape of a spiral, to encourage downward flow of the plurality of streams of water 152 and the mix of pollutants 220.

In a preferred embodiment of the apparatus 100, shown in FIG. 4, the base 116 of the sleeve 110 comprises a channel 122 extending along an entire perimeter of the industrial exhaust source 200. For instance, the base 116 of the present embodiment includes an inwardly-directed bottom section 124 ending in an upwardly-directed neck 126, the channel 122 being delimited by the sidewall 112, the bottom section 124 and the upwardly-directed neck 126. As best shown in FIG. 4, the channel 122 can be arranged in a sloped or tilted configuration towards the drainage hole 170 to help guide the water 152 and the mix of pollutants 220 along the channel 124 towards the hole 170, down through the hole 170 and into the pipe 172, thus avoiding their collection and stagnation at the base 116 of the sleeve 110. Other variants can exist, however; for instance, the base 116 of the sleeve 110 could have a midpoint at which it slopes downward both left and right, and there could then be two holes 170 and two pipes 172 through which the water 152 and the mix of pollutants 220 can drain out. In general, any number of drainage holes 170 and pipes 172 can be provided in the base 116 and extending from the base 116, respectively, and the channel 122 can be sloped towards the drainage holes 170.

In the preferred embodiment of the apparatus 100, indicated in FIGS. 1-3, the sleeve 110 is generally shaped as a cylinder. Such a shape allows for even distribution of the plurality of streams of water 152 around the sidewall 112 of the sleeve 110 since it is radially equidistant from the center nozzles 150. It also allows for easier flow of the plurality of streams of water 152 and the mix of pollutants 220 down along the sidewall 112 of the sleeve 110, since such a shape does not have corners or edges that would encourage trapping.

In another aspect of the apparatus 100, shown in FIG. 4, the at least one secondary tube 140 is horizontally oriented and the corresponding number of nozzles 150 are configured to inject water horizontally. Furthermore, the secondary tubes 140 are spaced vertically and parallel with respect to each other within the interior cavity 118 of the sleeve 110, as so are the nozzles 150. Also, the nozzles 150 are arranged generally along the central longitudinal axis (axial direction 111) of the cylindrical sleeve 110. Such a setup allows for efficient spacing of all the components, and for maximized output of the plurality of streams of water 152 from each of the nozzles 150. Notwithstanding, it is possible for other orientations to exist, for instance, multiple tubes 132 for water flow to be placed around the sidewall 112 of the sleeve 110, each having one secondary tube 140 connecting radially to one nozzle 150 centrally-located within the interior cavity 118 of the sleeve 110.

As mentioned heretofore, the apparatus 100 can include a sleeve-supporting structure 160 for supporting the sleeve 110 onto the industrial exhaust source 200. As shown in FIGS. 1-3, the sleeve-supporting structure 160 can include at least one ring 162 wrapped around the sleeve 110, a plurality of insert points 164 attached to or comprised in the at least one ring 162, and a corresponding plurality of beams 166 inserted into or attached to a respective insert point 164. The plurality of insert points 164 can be equidistantly-spaced around the at least one ring 162, as illustrated in FIG. 3. Each of the corresponding plurality of beams 166 has a top end 168, both shown in FIGS. 1 and 2. The beams 166 can be attached or connected to the industrial exhaust source 200 or to another surface such as a rooftop to provide stability to and/or support the apparatus 100.

Operation of the apparatus 100 is described hereinafter with references to FIGS. 4-7.

Figure 5:
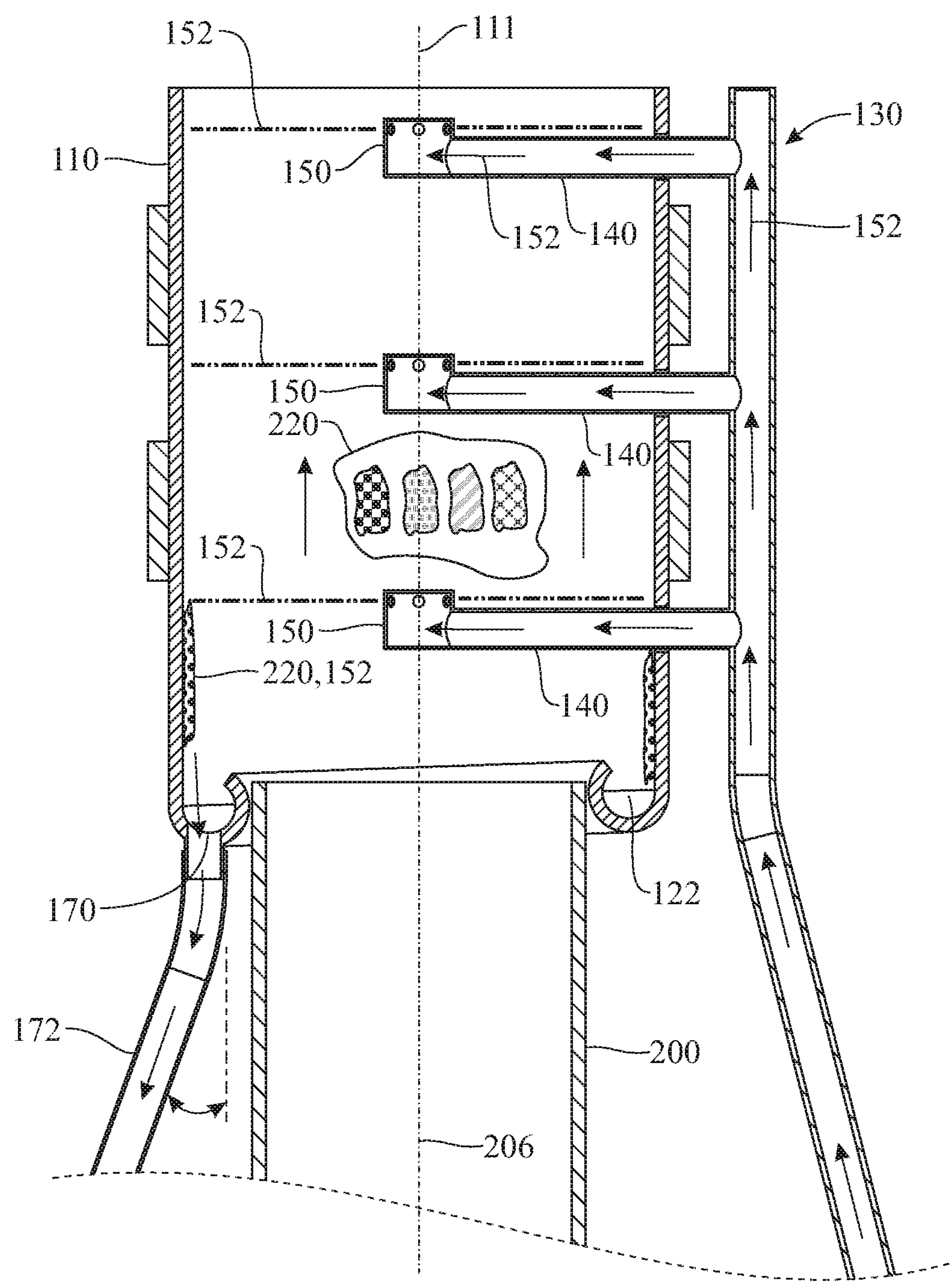
FIG. 5 presents a cross-sectional side elevation view of the first illustrative embodiment of the apparatus of the present invention, in a second stage of a method of reducing pollution in accordance with an illustrative embodiment the present invention.
Figure 6:
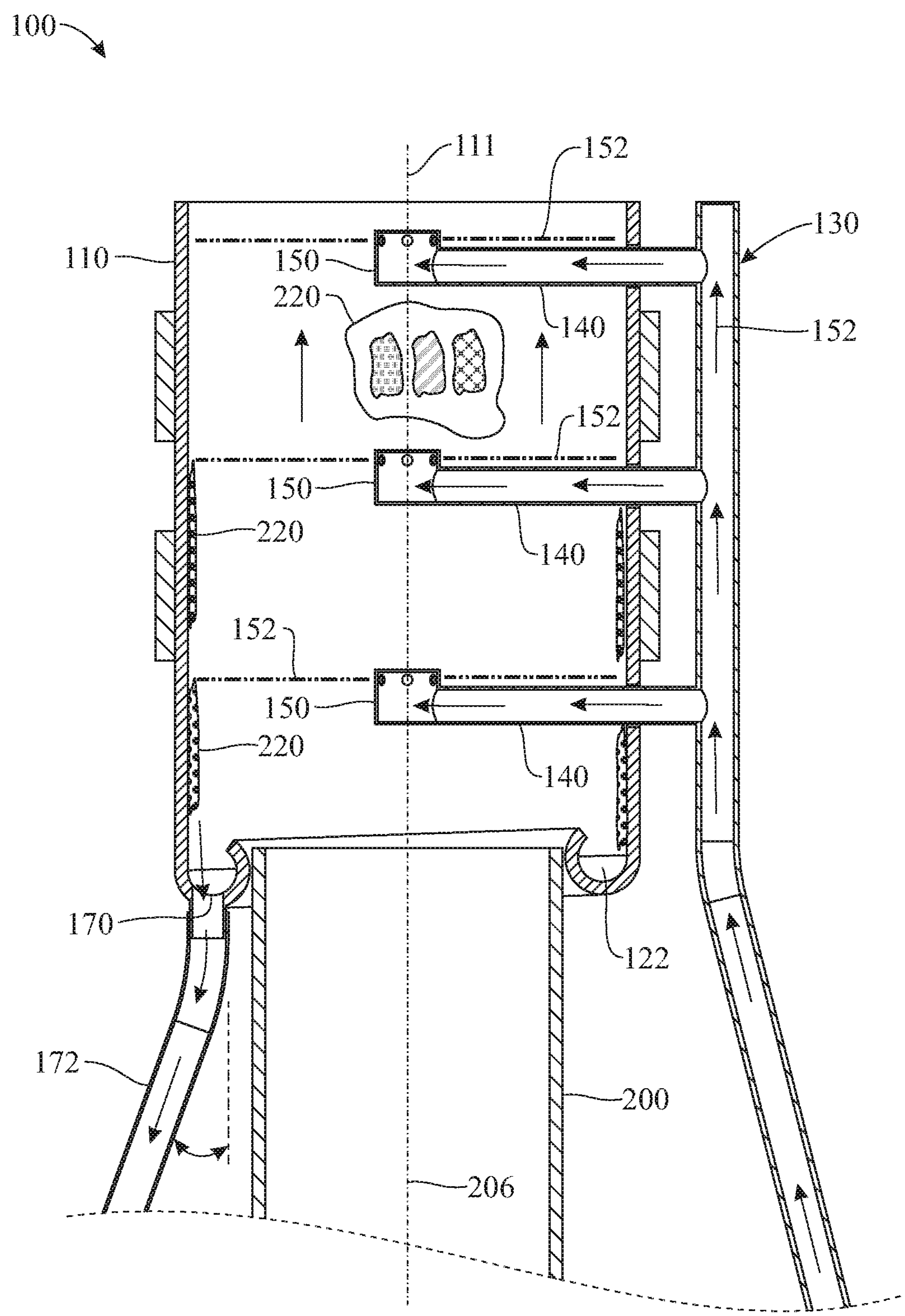
FIG. 6 presents a cross-sectional side elevation view of the first illustrative embodiment of the apparatus of the present invention, in a third stage of a method of reducing pollution in accordance with an illustrative embodiment the present invention.
Figure 7:
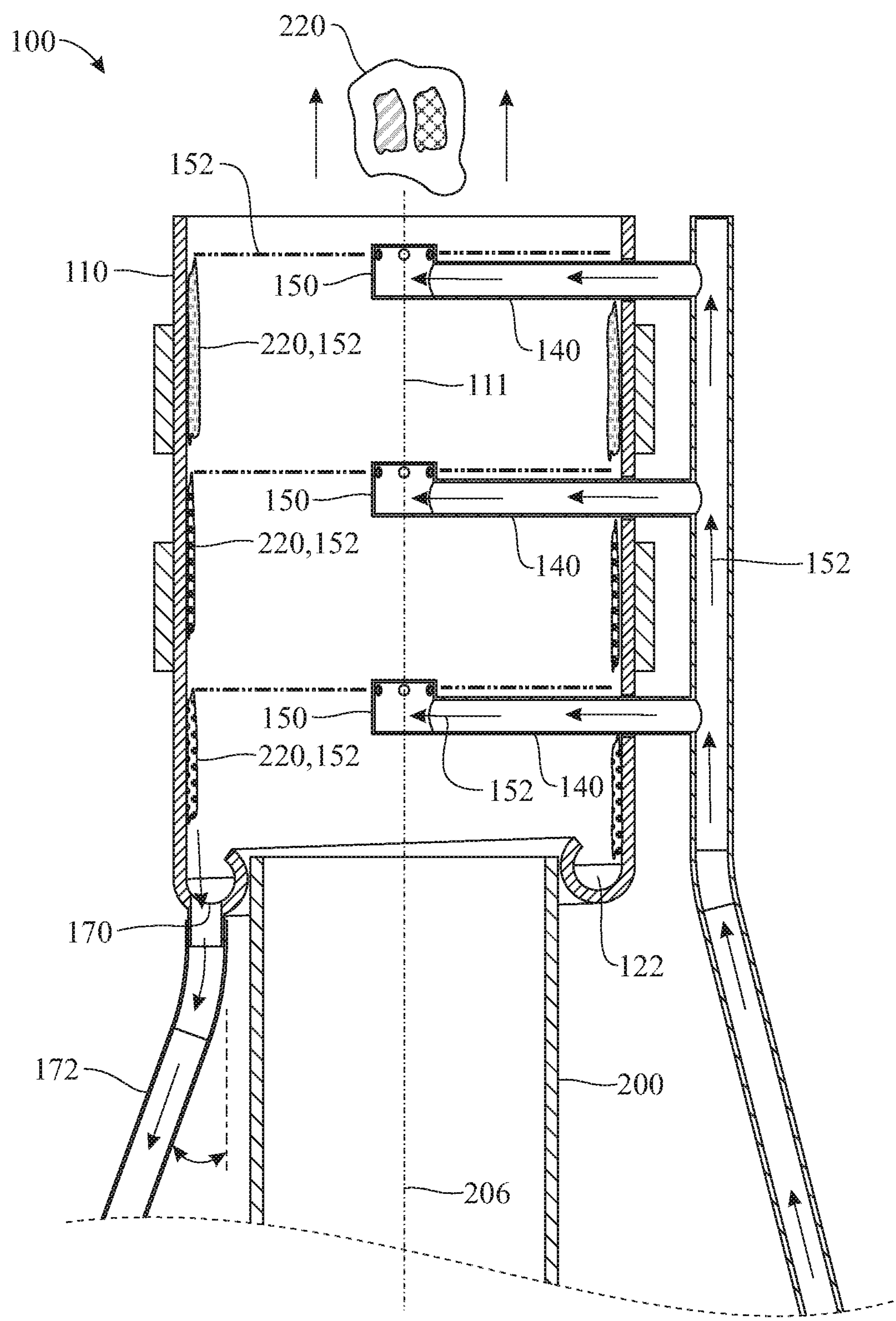
FIG. 7 presents a cross-sectional side elevation view of the first illustrative embodiment of the apparatus of the present invention, in a fourth stage of a method of reducing pollution in accordance with an illustrative embodiment the present invention.

As shown in FIG. 4, exhaust air is expelled by the industrial exhaust source 200, the air carrying a mix of pollutants 220 comprising one or more pollutants. The air is expelled in an axial direction 206 of the industrial exhaust source 220, as shown. Water is supplied to the apparatus 100 via the incoming water tubing assembly 132. As illustrated in FIGS. 5-7, as the exhaust air and mix of pollutants 220 ascends through the interior cavity 118 of the sleeve 110, the exhaust air and mix of pollutants 220 successively encounter the radially-arranged jets of water 152 sprinkled by each successive nozzle 150 of the set of stacked nozzles 150. The jets of water 152 successively and gradually push at least part of the mix of pollutants 220 out of the exhaust air and towards the sidewall 112 of the sleeve 110, so that the final exhaust air delivered to the atmosphere (FIG. 7) contains a lower amount of the mix of pollutants 220 than the initial exhaust air entering the sleeve 110 (FIG. 4). The water 152 and mix of pollutants 220 swept from the exhaust air wash down along the sidewall 112 of the sleeve 110, towards the base 116 of the sleeve 110. The channel 122 at the base 116 of the sleeve 110 collects the water 152 and mix of pollutants 220 carried by the water 152, and guides the water 152 and mix of pollutants 220 to the drain or hole 170. The hole 170 and pipe 172 drain the water 152 and the mix of pollutants 220 away from the sleeve 110. As mentioned heretofore and illustrated in FIG. 7, the result is that there are fewer pollutants 220 that will be emitted into the air through the open top end 114 of the sleeve 110.

As described heretofore, the nozzles 150 are preferably oriented towards the sidewall 112 of the sleeve 110 and the jets or streams of water 152 are preferably radial. This, and the fact that the nozzles 150 are preferably centrally located within the interior cavity 118, guarantees that a maximum water force is applied along the entire width of the interior cavity 118 of the sleeve 110, maximizing the ability to sweep the mix of pollutants 220 from the exhaust air.

Furthermore, having the pipe 172 sloped or tilted helps prevent clogging and bubble formation by the water 152 and the mix of pollutants 220. However, alternative embodiments are contemplated regarding the pipe 172 construction. For instance, the pipe 172 can be in the shape of a spiral, to encourage downward flow of the water 152 and the mix of pollutants 220.

Throughout the present document, water is understood to encompass pure water or, alternatively, a liquid comprising water or derived from water.

Since many modifications, variations, and changes in detail can be made to the described preferred embodiments of the invention, it is intended that all matters in the foregoing description and shown in the accompanying drawings be interpreted as illustrative and not in a limiting sense. Thus, the scope of the invention should be determined by the appended claims and their legal equivalents.

What is claimed is:

1. An apparatus for reducing pollution emitted into air by an industrial exhaust source expelling exhaust air carrying at least one pollutant, comprising:

a sleeve configured to extend from a top end of an industrial exhaust source, said sleeve comprising an interior cavity for the traveling therethrough of exhaust air from the industrial exhaust source, at least one sidewall delimiting the interior cavity, at least one opening on said one sidewall, and an open top end;

a support housing including at least one support ring enveloping said sleeve exterior and a plurality of support arms attached to the support ring on one end and resting on a separate support surface on an opposite end;

a sprinkler system for supplying water to said interior cavity of said sleeve, said sprinkler system comprising at least one nozzle extending through the at least one opening on said sidewall and positioned within the interior cavity, wherein the at least one nozzle is configured to inject water towards said at least one sidewall of said sleeve and through exhaust air traveling through said interior cavity and carrying at least one pollutant; and one or more drainage pipes open to said interior cavity of said sleeve for draining water and at least one pollutant carried by the water from the interior cavity, wherein said support housing stabilizes and supports weight of said sleeve and said sprinkler system weight on said industrial exhaust source.

2. The apparatus of claim 1, wherein a base of said sleeve comprises a channel configured to collect water and at least one pollutant falling along the at least one sidewall and to carry said water and at least one pollutant towards said one or more drainage pipes.

3. The apparatus of claim 2, wherein the base comprises an inwardly-directed bottom section and an upwardly-directed neck extending from the inwardly-directed bottom section in a spaced-apart relationship with the at least one sidewall of the sleeve, wherein the channel is delimited by the at least one sidewall, the inwardly-directed bottom section and the upwardly-directed neck.

4. The apparatus of claim 2, wherein the channel is sloped downward towards said one or more drainage pipes.

5. The apparatus of claim 2, wherein the one or more drainage pipes consist of a single drainage pipe, and wherein the channel is circumferentially-shaped and sloped downward towards said drainage pipe.

6. The apparatus of claim 1, further comprising a structure supporting the apparatus to extend from the top end of the industrial exhaust source.

7. The apparatus of claim 6, wherein the structure comprises at least one ring encircling said sleeve and a plurality of supporting beams resting against and extending from the at least one ring.

8. The apparatus of claim 1, wherein the sprinkler system further comprises an incoming water tubing assembly configured to receive water from a water supply source external to the sleeve, wherein the incoming water tubing assembly is in fluid communication with the at least one nozzle to feed water to the at least one nozzle.

9. The apparatus of claim 8, further comprising at least one secondary tube extending from the incoming water tubing assembly, through the sleeve and into the interior cavity, wherein each secondary tube of the at least one secondary tube carries, and is configured to feed water to, one or more nozzles of the at least one nozzle.

10. The apparatus of claim 9, wherein each secondary tube carries a single nozzle of the at least one nozzle.

11. The apparatus of claim 1, wherein the sleeve is cylindrical.

12. The apparatus of claim 1, wherein the at least one nozzle is configured to inject water horizontally towards the at least one sidewall of the sleeve.

13. The apparatus of claim 1, wherein the at least one nozzle is arranged at a central longitudinal axis of the sleeve.

14. The apparatus of claim 13, wherein the at least one nozzle is configured to inject a plurality of water jets radially outward thereof.

15. The apparatus of claim 1, wherein the at least one nozzle comprises two or more nozzles arranged vertically spaced apart relative to one another.

16. The apparatus of claim 15, wherein the two or more nozzles are arranged in vertical registration relative to one another.

17. The apparatus of claim 1, wherein the one or more drainage pipes are sloped downward.

18. A method for reducing pollution emitted into air by an industrial exhaust source expelling exhaust air carrying at least one pollutant comprises the steps of:

providing an industrial exhaust source with an apparatus comprising:

a sleeve configured to extend from a top end of an industrial exhaust source, said sleeve comprising an interior cavity for the traveling therethrough of exhaust air from the industrial exhaust source, at least one sidewall delimiting the interior cavity, at least one opening on said one sidewall, and an open top end;

a support housing including at least one support ring enveloping said sleeve exterior and a plurality of support arms attached to the support ring on one end and resting on a separate support surface on an opposite end;

a sprinkler system for supplying water to said interior cavity of said sleeve, said sprinkler system comprising at least one nozzle extending through the at least one opening on said sidewall and positioned within the interior cavity substantially normal to the axial direction of the industrial exhaust source expelling exhaust air, wherein the at least one nozzle is configured to inject water towards said at least one sidewall of said sleeve and through exhaust air traveling through said interior cavity and carrying at least one pollutant; and one or more drainage pipes open to said interior cavity of said sleeve for draining water and at least one pollutant carried by the water from the interior cavity, wherein said support housing stabilizes and supports weight of said sleeve and said sprinkler system weight on said industrial exhaust source;

supplying water to said sprinkler system;

injecting, by said at least one nozzle, said supplied water towards the at least one sidewall of the sleeve;

removing, by said water injected from said at least one nozzle, one or more pollutants from exhaust air traveling through said sleeve;

directing, by said at least one sidewall of the sleeve, said water and said one or more removed pollutants to fall towards the one or more drainage pipes; and draining the fallen water and one or more removed pollutants through the one or more drainage pipes.

* * * * *